US005164718A

United States Patent [19]

Cedergren

[11] Patent Number: 5,164,718

[45] Date of Patent: Nov. 17, 1992

[54] SEPARATE LOCK AND UNLOCK CODES FOR A SECURITY BOX

[75] Inventor: Stig Cedergren, Stockholm, Sweden

[73] Assignee: Global Security AB, Stockholm, Sweden

[21] Appl. No.: 746,802

[22] Filed: Aug. 14, 1991

Related U.S. Application Data

[63] Continuation of Ser. No. 469,417, filed as PCT/SE88/00499, Sep. 27, 1988, abandoned.

[30] Foreign Application Priority Data

Sep. 30, 1987 [SE] Sweden ............................... 8703775

[51] Int. Cl.[5] .......................... H04Q 1/00; E05G 1/00

[52] U.S. Cl. .......................... 340/825.31; 340/825.56; 70/278; 70/63; 380/23; 109/2

[58] Field of Search ...................... 340/825.31, 825.34, 340/825.35, 825.56; 70/278, 63; 380/23; 283/72, 73, 105; 109/2

[56] References Cited

U.S. PATENT DOCUMENTS

| | | | |
|---|---|---|---|
| 1,401,338 | 12/1921 | Laracy | 283/73 |
| 3,968,350 | 7/1976 | Watson | 283/73 |
| 4,534,582 | 8/1985 | Howard | 283/105 |
| 4,663,621 | 5/1987 | Field et al. | 340/835.31 |
| 4,727,368 | 2/1988 | Larson et al. | 540/825.31 |
| 4,766,746 | 8/1988 | Henderson et al. | 340/825.31 |
| 4,829,296 | 5/1989 | Clark et al. | 340/825.31 |
| 4,912,460 | 3/1990 | Chu | 340/825.31 |
| 4,928,098 | 5/1990 | Dannhaeuser | 340/825.56 |
| 5,009,088 | 4/1991 | Cislo | 70/63 |
| 5,021,776 | 6/1991 | Anderson | 340/825.31 |

FOREIGN PATENT DOCUMENTS

| | | |
|---|---|---|
| 2437501 | 2/1976 | Fed. Rep. of Germany . |
| 3300170 | 7/1984 | Fed. Rep. of Germany . |
| 403160 | 6/1975 | Sweden . |
| 405754 | 9/1978 | Sweden . |
| 409123 | 3/1979 | Sweden . |
| 85022209-3 | 11/1986 | Sweden . |

OTHER PUBLICATIONS

"Microcomputer Management and Programming" (Carol Anne Ogdin), Prentice-Hall Inc., 1980 pp. 136-139.

*Primary Examiner*—Donald J. Yusko
*Assistant Examiner*—Brian Zimmerman
*Attorney, Agent, or Firm*—Burns, Doane, Swecker & Mathis

[57] ABSTRACT

A locking system for locking and unlocking a container wherein the locking system is controlled via an electronically controlled code lock interacting with a control device. The code lock is pre-set in such a way that, for the purpose of locking, the code lock is arranged so as to be allocated a unique locking code for each individual occasion and, for the purpose of unlocking, is arranged to be allocated an unlocking code which differs from the locking code, which unlocking code is unique for each individual occasion. In the locking system, a pre-determined locking signal sequence is related to a pre-determined unlocking signal sequence, and, associated with the container, is an identification marking including an information carrier and a password associated with the signal sequence for unlocking the container.

16 Claims, 4 Drawing Sheets

SEPARATE LOCK AND UNLOCK CODES FOR A SECURITY BOX

This application is a continuation of application Ser. No. 07/469,417 now abandoned, filed Mar. 29, 1990 based on PCT International Application No. PCT/SE88/00499 filed on Sep. 27, 1988.

BACKGROUND OF THE INVENTION

The procedure generally adopted at the present time for the transport of money between companies and banks, for example, is for bank notes and possibly coins to be placed inside cassettes, i.e. inside metal containers with lids which are then locked. Both the sender and the recipient hold keys for the cassettes in question, of course. In order to increase security during transport and holding, it has previously been suggested that the cassettes should be equipped with locking devices such that they are locked with one key and are unlocked with a different key. What this means in practice is that the company has one key for locking the cassette, and the bank or some other recipient has another key for unlocking the cassette, or vice versa. The underlying idea for the system is attractive, although it is not considered to provide adequate security to meet current and furture safety requirements.

The present invention is based on the aforementioned underlying idea with two separate measures for the locking and unlocking functions. The invention is intended first and foremost to be applied in conjunction with computer equipment, whereby considerable security is achieved and tampering with the locking function is prevented. There is also a requirement to prevent unauthorized access to the contents which are to be transported or stored.

SUMMARY OF THE INVENTION

A locking system in accordance with the present invention is characterized essentially in that the locking device or similar in question on the storage space or transport container which is to be used is controlled via a code lock which is pre-set in such a way that, for the purpose of locking, the code lock is so arranged as to be allocated a unique locking code and, for the purpose of unlocking, with a code which differs from the aforementioned locking code, in conjunction with which the transport container or similar has affixed to it identification marking constituting a pass-word for an unlocking code marked in a similar fashion.

A code lock in accordance with the invention preferably consists of an electronically controlled code lock capable of connection to a control device for the entry of locking code signal sequences and code signal sequences for unlocking, in conjunction with which the electronics are programmed in such a way that a predetermined locking signal sequence is related to a predetermined unlocking signal sequence, and in conjunction with which the marking constitutes an information carrier from which to obtain the signal sequence for unlocking.

BRIEF DESCRIPTION OF THE DRAWINGS

The characteristic features of the present invention can be appreciated from the following patent claims.

The invention is described below in greater detail with reference to the accompanying drawings, which in schematic form show an illustrative embodiment of the invention.

DESCRIPTION OF THE PREFERRED EMBODIMENTS

Figure 1:
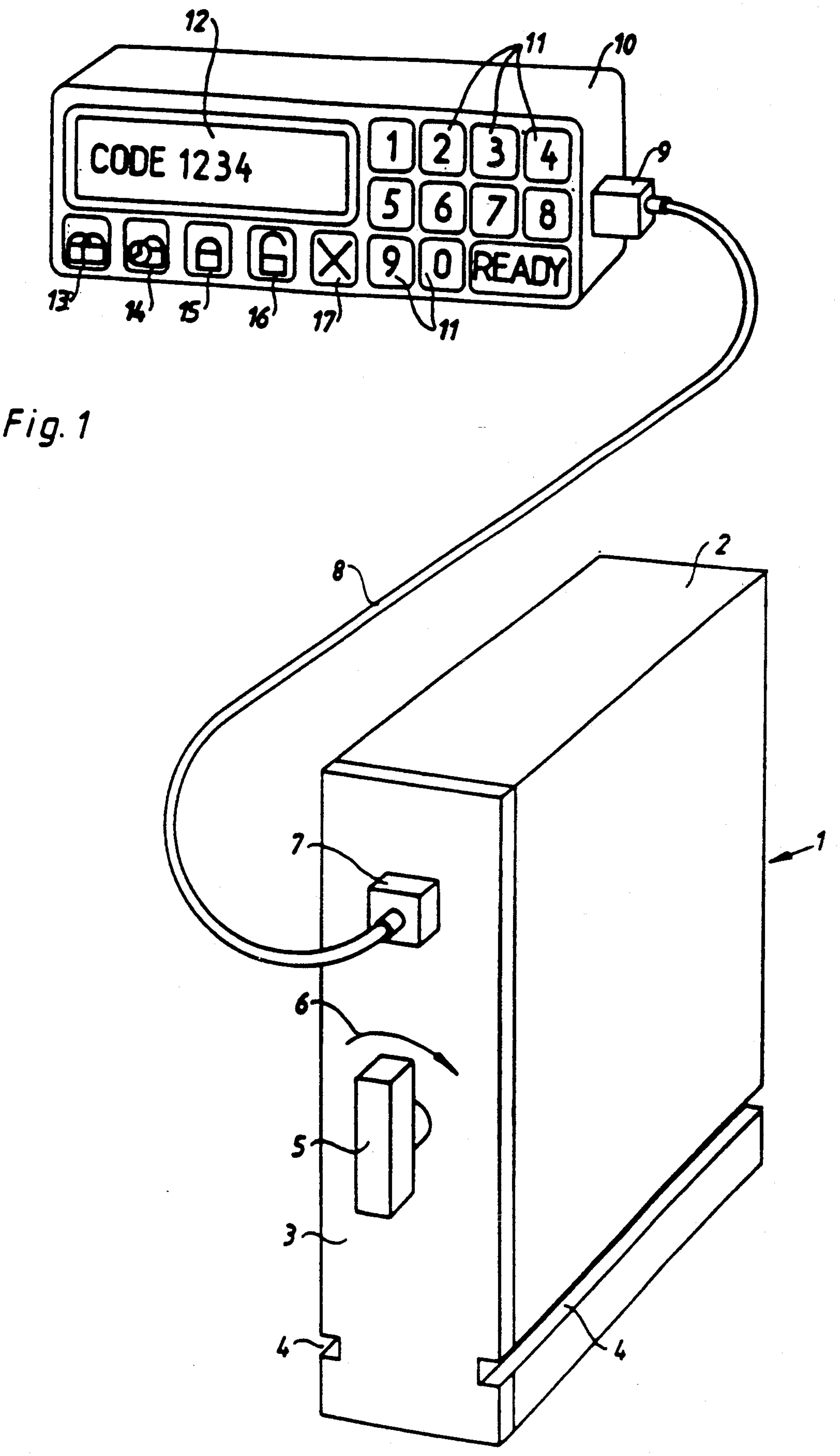
FIG. 1 shows a transport container, a so-called cassette, to which an electronic control unit is connected.

The cassette illustrated in FIG. 1 consists of a box 2 and a lid 3. The box and the lid are preferably executed in aluminium, sheet steel or some other material, and are provided with lateral grooves 4 for attachment during storage, for example in a storage or transport space. Attachment devices for engaging with the lateral grooves can be executed in an appropriate fashion having regard for the prevailing conditions. The lid 3 is provided with an operating handle 5 which, for the purpose of locking the cassette, can be turned in the direction shown by the arrow 6. Control electronics, not shown in FIG. 1, are mounted on the inside of the lid 3, which electronics are connected via a contact 7 and a wire 8 to a further contact 9 on the control unit 10. As can be seen from FIG. 1, the control unit consists of a number of keys 11 for producing combinations of characters, and a panel 12. Provided in addition to these push-button keys is one control key 13 for the transport locking function, one 14 for setting the time, which will be described later, one 15 providing a storage function, and one 16 providing an unlocking function. A further control key 17 is provided for the purpose of cancelling operations, for example in the event of an incorrect combination of characters having been entered. As will be appreciated later, the basis of the whole system is the interaction with a computer arranged inside the cassette.

This means that, by entering certain combinations of characters via the keys 11, and by utilizing the effect of the other keys, it is possible, in addition to the mechanical locking afforded by the handle 5, for the cassette to be locked prior to transport and/or storage and to be unlocked in a corresponding fashion after transport and/or storage.

Figure 2:
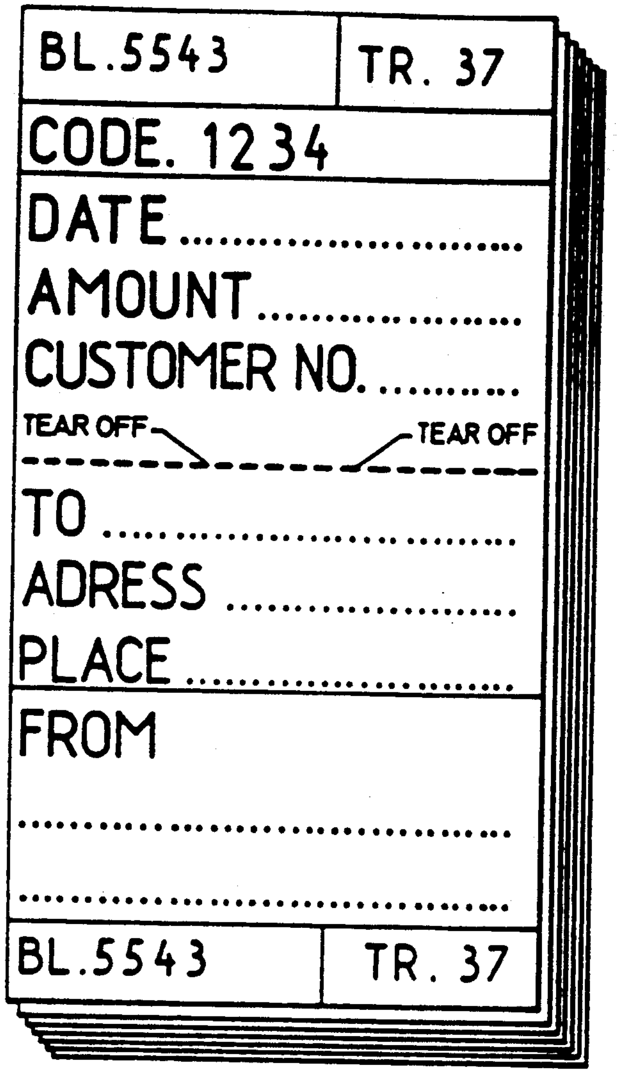
FIG. 2 shows a so-called transport block consisting of a number of transport tickets.
Figure 3:
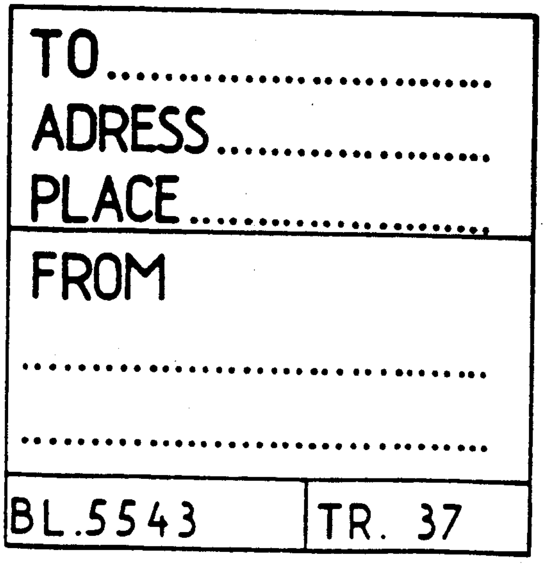
FIG. 3 is an address label to be attached to the cassette.

Before a cassette can be despatched from a sender to a recipient, a so-called transport block is prepared in accordance with the invention, which transport block consists of a number of tickets, as can be appreciated from FIG. 2. This transport block has in its top left-hand corner a number which indicates the identification reference for the block, 5543. The box on the right indicates that transport is involved, i.e. the ticket concerned in this case bears the number 37. The information which appears on the next line is the code which must be entered via the keys 11 in order to permit the cassette to be locked, in this case 1234. The other items on the transport block are simply details of the date and address, i.e. of when, from where, and to where the cassette is to be sent. The block is perforated at "riv" (="tear"), however. A part of the ticket can be torn off at this point to provide an address label, as shown in FIG. 3. The address label in the latter Figure thus constitutes the lower part of the transport block in FIG. 2.

This address label may appropriately be provided with a self-adhesive material, or can be stuck to the cassette with adhesive at an appropriate place.

Figure 4:
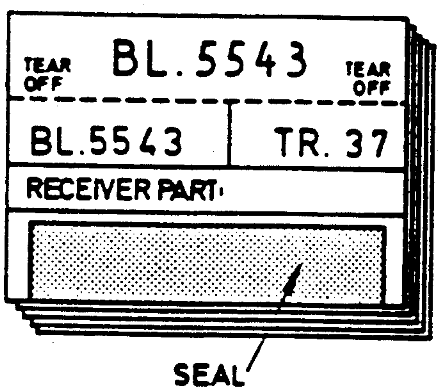
FIG. 4 shows a receiver block.
Figure 5:
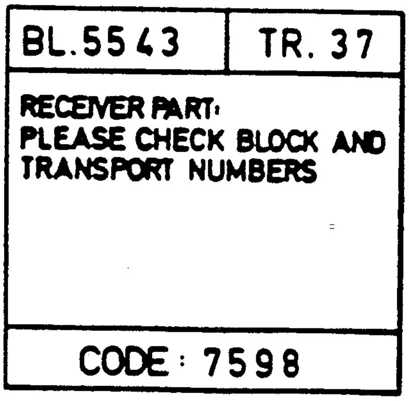
FIG. 5 shows a ticket torn from the receiver block.

The recipient has a block containing corresponding page numbering, i.e. in this case 5543 and the transport number 37. A ticket can be torn off at the perforation in the recipient's block, which ticket contains a sealed part, as illustrated in FIG. 4. Once the ticket has been torn off and the sealed part has been opened, a further combination of code characters is exposed, which is used in conjunction with the unlocking of the cassette.

The despatch of a cassette, for example from a bank to a company, takes place as follows. It is assumed that the company and the bank have corresponding blocks of tickets in their possession, i.e. a transport block in the case of the bank, and a recipient's block in the case of the company. It is further assumed that, as will be appreciated from FIG. 2, ticket 5543 is used with regard to transport consignment No. 37. Provided in this case is a direct code, 1234, which must be used in conjunction with the locking of the cassette. Prior to despatch, the ticket is completed with the necessary information, i.e. the date 870822 (=22.08.87), a control number KR 120000, and below this a customer number 171012. The address panel is then completed, i.e. in this case the company "AB" at the address Vallgatan in Åm å l. The sender's details are filled in on the lower part of the ticket, i.e. in this case X-banken in Säffle.

The valuable documents which are to be transported are placed inside the cassette 1, and the lid 3 is locked to the container by turning the handle 5. In order for transport locking to be effected, the code 1234 indicated above must be entered via the keys 11. It is first necessary, however, for the desired function to be determined, i.e. in this case "transport". Transport locking is effected by depressing the key 13, followed by entry of the code 1234. The display panel 12 now indicates that the code in question has been entered. In the interests of security, however, the code must be repeated before final locking is effected, in conjunction with which the function is activated by a final depression of the key marked "KLAR" (="Ready"). The sequence of operations indicated here is pre-programmed in the computer, i.e. the code must be entered twice in order for it to be approved. Incorrect keying is effectively prevented in this way.

Once the indication has been obtained on the display panel and locking has been effected, the lower part of the ticket on the transport block is torn off and is stuck to the cassette. As will be appreciated from FIG. 3, the address label contains a clear indication of the destination of the cassette. The aforementioned ticket number 5543 also appears.

Once the cassette has reached company AB, the recipient takes out his recipient's block and searches through the tickets until he finds the one bearing the number 5543 and transport No. 37. The ticket in question is torn from the block, at the same time as which the seal illustrated in FIG. 4 is broken by the pulling action. The nature of the seal is such that a flap can be folded out, and a new code can be found on the inside of the flap, i.e. in this case 7598. Another control unit 10 is now connected to the cassette in a corresponding fashion to that illustrated in FIG. 1, so that a connection is made with the computer contained inside the cassette 1. In order to unlock the cassette in question, the key 16 is now depressed, in so doing engaging the unlocking function. The code 7598 is now entered via the keys 11, followed by depressing the key marked "KLAR" (="Ready"). As in the case of locking the cassette, the code is now entered once more, in conjunction with which an indication appears on the display panel 12 to the effect that the correct code number has been entered and the cassette is unlocked, which means that the handle 5 can now be turned back, allowing the lid to be removed from the cassette container.

As will have been appreciated from the foregoing, a security function which effectively prevents unauthorized operation and opening of the cassette is achieved in particularly simple fashion.

A further advantage of the system described here is that "throwaway" disposable keys are used on every occasion. As soon as transport has been effected and the recipient has opened the cassette, the codes last used cannot be reused. In practice the computer inside a cassette is preferably programmed so that it is capable of functioning only with those codes which are present in a single block of tickets, and for this purpose both the code information of the transport block and the code information of the recipient's block must be related to one another. It is consequently not possible to use any of the other codes contained in the recipient's block of tickets to open the cassette, the only possibld code being the one which is related to the code in the transport block, i.e. in this case code 1234 must be related to code 7598.

The bank and the company should preferably have in their possession both recipients' blocks and transport blocks, in order to be able to send cassettes to and from one another. In cases such as these, the computer should be programmed for the codes which are contained in the respective blocks of tickets. The nature of the electronics is accordingly such that it will "remember" only a certain number of the lockin̲g codes used, which can only be used once. In practice it may be appropriate to programme the computer in such a way that only three attempts at the opening code can be made at the recipient's premises. A fourth attempt using the wrong code causes the cassette to be blocked, and it must then be returned to the cassette supplier for opening under the control of an authorized person.

Figure 6:
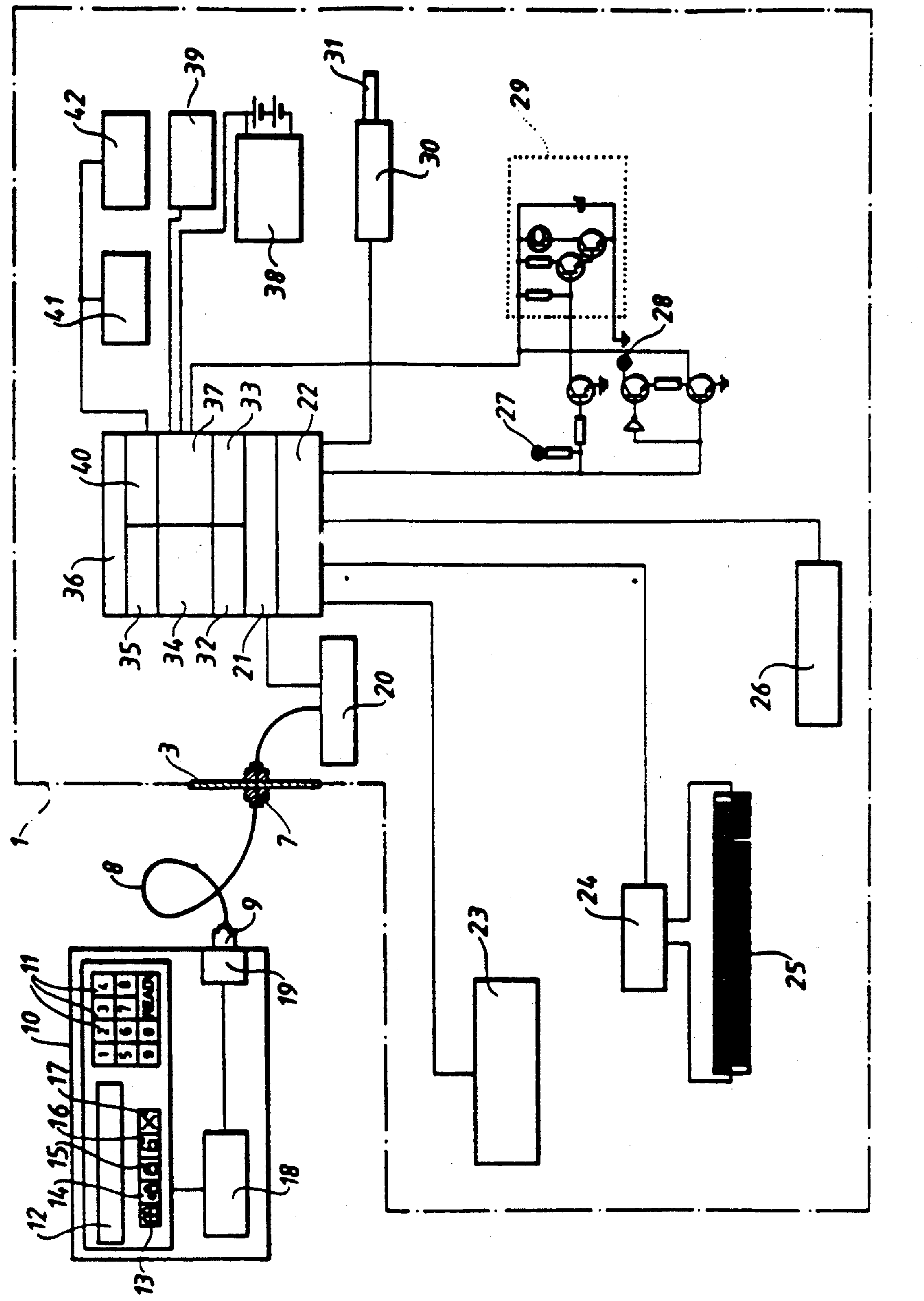
FIG. 6 is a block diagram which shows the design of the electronics in the cassette and the control unit.

As already mentioned, FIG. 6 shows an example of a practical design for the control unit and the cassette, in block diagram form. The reference designations for the components illustrated in FIG. 1 have been transferred to this Figure. In addition to the operating push-buttons and display panel previously referred to, the control unit 10 also contains a so-called single-chip computer 18 with a Uart circuit. This is controlled by the system of control push-buttons and is connected directly to a transmitter-receiver unit 19 for two-way communication via the cable 8 and its contacts 7 and 9. The signals pass via the lid in the cassette 1 to another transmitter-receiver unit 20. The latter is in turn connected to the computer via a Uart circuit 21, which is linked to a control circuit 22, and which is connected not only to two moisture sensors 23 for the detection of any moisture which may be present inside the cassette, but also to an interruption detector 24, which is connected to a network of sensor wires 25 contained inside the cassette for the purpose of sensing mechanical damage. Wire networks of this kind are referred to in practice as "flex-strips". Also connected to the control circuit 22 are a locking detector 26 for sensing the correct locking status, and a circuit for controlling photo-cell devices 27 and 28 for sensing any movement of the lid, and a detonator circuit 29 and a magnetic lock consisting of, for example, a solenoid 30 and an associated locking tongue 31. The aforementioned detonator circuit 29 is an arrangement which controls the activation of dye cartridges (not shown) contained inside the cassette itself, which can be activated in the event of any attempt at forced entry into the cassette, in this way staining any money or valuable documents present inside the cassette. The solenoid 30 and the locking tongue 31 constitute the mechanical locking devices which, apart from the actual lock 5, secure the lid 3 to the cassette 1.

The Uart circuit 21 is connected both to a monitoring circuit 32 (a so-called "watch-dog" circuit) and to an electronic back-up memory 33. The monitoring circuit 32 interacts with a timer circuit 34 and a RAM memory 35 for interacting with a central processor unit 36. The design also includes a sensor circuit 37, which is linked both to the detonator circuit 29, to a control and reset logic circuit 38, and to a temperature sensor circuit 39. A decoding circuit 41 and also an EPROM circuit 42 are connected via an external data bus 40.

From a technical point of view the components described here interact in a fashion in accordance with computer technology in order to achieve the functions described previously.

An installation of the kind indicated here can, of course, be constructed in any of a great many ways, and can also be provided with additional security features and indicator devices, although what is described above represents a practically suitable embodiment. It can be mentioned that, for the benefit of the transporting individual, an indicator box can be connected to the cassette in the same way as the control unit 10 in order to give a clear indication to the effect that the cassette is correctly locked for transport. Such an indicator box does not, of course, contain any operating devices of a technical nature and may appropriately be incorporated into a monitoring system in the vehicle which is to perform the transport operation. It is also possible through an arrangement of this kind to achieve the advantage that any fault in any of the cassettes can be detected during transport.

I claim:

1. A locking system comprising means for locking and unlocking a container means including an electronically controlled code lock and a control device, said control device interacting with said electronically controlled code lock in locking and unlocking said container means, said electronically controlled code lock being preset with a plurality of preselected locking codes differing from each other and a plurality of preselected unlocking codes differing from each other, each of said plurality of preselected locking codes being paired with one of said plurality of preselected unlocking codes, with each said pair of one of said plurality of preselected locking codes and one of said plurality of preselected unlocking codes differing from each other said pair of one of said plurality of preselected locking codes and one of said plurality of preselected unlocking codes, within each said pair said one of said plurality of preselected locking codes differing from said one of said plurality of preselected unlocking codes, with each said pair of one of said plurality of preselected locking codes and one of said plurality of preselected unlocking codes being utilized only once from within said plurality of preselected locking codes and said plurality of preselected unlocking codes for a locking and unlocking sequence of said container means, said electronically controlled code lock being set by said control device for locking said container means with one of said plurality of preselected locking codes, and for unlocking said container means the one of said plurality of preselected unlocking codes paired with said set one of said plurality of preselected locking codes is communicated by said control device to said electronically controlled code lock, wherein in said locking system a pre-determined locking signal sequence is related to a pre-determined unlocking signal sequence and, associated with said container means, an identification marking comprising an information carrier having an identification reference, said identification reference associating one of said plurality of preselected locking codes having a predetermined locking signal sequence for locking said container means with one of said plurality of preselected unlocking codes having a predetermined unlocking signal sequence for unlocking said container means.

2. The locking system according to claim 1, characterized in that the control device is permanently attached to the container means.

3. The locking system according to claim 1, characterized in that the control device includes a separate unit capable of being connected to circuitry of the container means associated with locking and unlocking of said container means, wherein said control device is provided with a function selector for the selection of the locking and unlocking function, and with code entry devices in the form of c,erating buttons.

4. The locking system according to claim 3, characterized in that said operating buttons control a single-chip computer with a Uart circuit which is in turn connected to a transmitter-receiver unit for two-way communication with said circuitry of the container means.

5. The locking system according to claim 4, characterized in that said circuitry of said container means includes, apart from a two-way communications component, a Uart circuit connected thereto and linked to a monitoring control circuit for controlling at least one of the locking, unauthorized entry and code interpretation functions associated with said locking system.

6. The locking system according to claim 5, wherein one said control device is kept by a sender of said container means for said locking func'.on and another said control device is kept by the recipient of said container means for said unlocking function.

7. The locking system according to claim 4, wherein one said control device is kept by a sender of said container means for said locking function and another said control device is kept by the recipient of said container means for said unlocking function.

8. The locking system according to claim 3, wherein one said control device is kept by a sender of said container means for said locking function and another said control device is kept by the recipient of said container means for said unlocking function.

9. The locking system according to claim 1, characterized in that the identification marking includes a sheet means, provided with said identification reference, which sheet means is capable of being removed from a holder means, said sheet means being associated with the exposure of the preselected locking code to be entered into the control device, and the preselected unlocking code is capable of being obtained by the removal from a further holder means of another sheet means containing said identification reference, which another sheet means, prior to its removal from said further holder means, conceals the unlocking code.

10. The locking system according to claim 9, characterized in that the control device is permanently attached to the container means.

11. The locking system according to claim 9, characterized in that the control device includes a separate unit capable of being connected to circuitry of the container means associated with locking and unlocking of said container means, wherein said control device is provided with a function selector for the selection of the locking and unlocking function, and with code entry devices in the form of operating buttons.

12. The locking system according to claim 11, wherein one said control device is kept by a sender of said container means for said locking function and another said control device is kept by the recipient of said container means for said unlocking function.

13. The locking system according to claim 11, characterized in that said operating buttons control a single-chip computer with a Uart circuit which is in turn connected to a transmitter-receiver unit for two-way communication with said circuitry of the container means.

14. The locking system according to claim 13, characterized in that said circuitry of said container means includes, apart from a two-way communications component, a Uart circuit connected thereto and linked to a monitoring control circuit for controlling at least one of the locking, unauthorized entry and code interpretation functions associated with said locking system.

15. The locking system according to claim 13, wherein one said control device is kept by a sender of said container means for said locking function and another said control device is kept by the recipient of said container means for said unlocking function.

16. The locking system according to claim 14, wherein one said control device is kept by a sender of said container means for said locking function and another said control device is kept by the recipient of said container means for said unlocking function.

* * * * *